(12) United States Patent
Seymour et al.

(10) Patent No.: US 8,705,209 B2
(45) Date of Patent: Apr. 22, 2014

(54) SUSPENSION CLAMP FOR CLAMPING A DISK DRIVE SUSPENSION TO AN ACTUATOR ARM

(75) Inventors: Mark S. Seymour, Felton, CA (US); Mitchell D. Dougherty, Los Gatos, CA (US); Walter G. Banshak, Jr., Morgan Hill, CA (US); Geoffrey A. Hales, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 43 days.

(21) Appl. No.: 13/273,428

(22) Filed: Oct. 14, 2011

(65) Prior Publication Data

US 2013/0094110 A1      Apr. 18, 2013

(51) Int. Cl.
*G11B 5/48*       (2006.01)
*G11B 21/16*      (2006.01)

(52) U.S. Cl.
USPC .................. 360/245.2; 360/265.9; 360/244.5; 29/603.03

(58) Field of Classification Search
USPC ............... 360/245.2, 244.5, 265.9; 29/603.03
See application file for complete search history.

(56) References Cited

U.S. PATENT DOCUMENTS

| | | |
|---|---|---|
| 4,862,584 A | 9/1989 | Budy et al. |
| 4,943,875 A | 7/1990 | Reidenbach et al. |
| 4,947,275 A | 8/1990 | Hinlein |
| 5,062,018 A | 10/1991 | Yaeger |
| 5,143,131 A | 9/1992 | Seigneur et al. |
| 5,296,984 A | 3/1994 | Fick |
| 5,339,702 A | 8/1994 | Viches |
| 5,444,587 A | 8/1995 | Johnson et al. |
| 5,491,413 A | 2/1996 | Guzik |
| 5,495,375 A | 2/1996 | Baasch et al. |
| 5,696,653 A | 12/1997 | Lacey |
| 5,715,117 A | 2/1998 | Brooks |
| 5,731,932 A | 3/1998 | Crane |
| 5,771,139 A | 6/1998 | Lee et al. |
| 5,781,380 A | 7/1998 | Berding et al. |
| 5,786,677 A | 7/1998 | Marr |
| 5,844,420 A | 12/1998 | Weber et al. |
| 5,862,019 A | 1/1999 | Larson |
| 5,930,083 A | 7/1999 | Adley |
| 5,946,164 A | 8/1999 | Tracy |
| 6,002,551 A | 12/1999 | Goss et al. |
| 6,038,755 A | 3/2000 | Mendel et al. |
| 6,049,969 A | 4/2000 | Jenkins et al. |
| 6,061,896 A | 5/2000 | Tracy |
| 6,078,469 A | 6/2000 | Girard |
| 6,140,661 A | 10/2000 | Nodelman |
| 6,150,813 A | 11/2000 | Schadewald, Jr. et al. |
| 6,157,521 A | 12/2000 | Utsunomiya |

(Continued)

OTHER PUBLICATIONS

Office Action dated Jan. 9, 2013 from U.S. Appl. No. 13/273,437, 20 pages.

(Continued)

*Primary Examiner* — Jefferson Evans

(57) ABSTRACT

A suspension clamp is disclosed for clamping a disk drive suspension to an actuator arm. The suspension clamp comprises a housing including a spring operable to bias a latching member, wherein the latching member is rotatable about a pivot. After compressing the spring and rotating the latching member in a first direction, the latching member is operable to clamp the suspension to the actuator arm by decompressing the spring.

6 Claims, 11 Drawing Sheets

(56) References Cited

U.S. PATENT DOCUMENTS

| | | | |
|---|---|---|---|
| 6,166,886 A | 12/2000 | Toensing | |
| 6,236,201 B1 | 5/2001 | Kilicci et al. | |
| 6,324,130 B1 | 11/2001 | Hatam-Tabrizi et al. | |
| 6,346,809 B1 | 2/2002 | Karam, II | |
| 6,392,844 B1 | 5/2002 | Summers | |
| 6,407,888 B1 | 6/2002 | Crane | |
| 6,417,993 B1 | 7/2002 | Kant et al. | |
| 6,459,260 B1 | 10/2002 | Bonin et al. | |
| 6,472,866 B2 | 10/2002 | Aslami | |
| 6,493,186 B1 | 12/2002 | Segar et al. | |
| 6,510,752 B1 | 1/2003 | Sacks et al. | |
| 6,531,867 B1 | 3/2003 | Greene et al. | |
| 6,571,454 B1 | 6/2003 | Haney et al. | |
| 6,708,389 B1 | 3/2004 | Carlson et al. | |
| 6,751,064 B2 * | 6/2004 | Kuwajima et al. | 360/244.8 |
| 6,848,168 B1 | 2/2005 | Slife et al. | |
| 6,889,424 B2 | 5/2005 | Slife et al. | |
| 6,941,641 B2 * | 9/2005 | Van Sloun | 29/603.03 |
| 7,061,235 B2 | 6/2006 | Guzik et al. | |
| 7,129,702 B2 | 10/2006 | Mori et al. | |
| 7,131,346 B1 | 11/2006 | Buttar et al. | |
| 7,135,861 B2 | 11/2006 | Mori et al. | |
| 7,141,969 B2 | 11/2006 | Guzik | |
| 7,154,699 B2 | 12/2006 | Subrahamanyan et al. | |
| 7,159,299 B1 | 1/2007 | McMunigal et al. | |
| 7,183,762 B2 | 2/2007 | Yamamoto | |
| 7,194,802 B2 | 3/2007 | Fayeulle et al. | |
| 7,196,512 B2 | 3/2007 | Kainuma et al. | |
| 7,207,097 B2 | 4/2007 | Detjens et al. | |
| 7,248,039 B2 | 7/2007 | Green et al. | |
| 7,288,935 B2 | 10/2007 | Farren et al. | |
| 7,429,857 B2 | 9/2008 | Guzik et al. | |
| 7,452,213 B2 | 11/2008 | Herdendorf et al. | |
| 7,471,488 B1 | 12/2008 | Zhang | |
| 7,502,204 B2 * | 3/2009 | White et al. | 360/244.5 |
| 7,505,860 B2 | 3/2009 | Herdendorf et al. | |
| 7,509,224 B2 | 3/2009 | Holwell et al. | |
| 7,509,225 B2 | 3/2009 | Anderson et al. | |
| 7,520,047 B2 | 4/2009 | Collins et al. | |
| 7,529,635 B2 | 5/2009 | Anderson et al. | |
| 7,542,240 B1 * | 6/2009 | Bjorstrom et al. | 360/244.5 |
| 7,542,868 B2 | 6/2009 | Herdendorf et al. | |
| 7,546,216 B2 | 6/2009 | Herdendorf et al. | |
| 7,652,851 B2 * | 1/2010 | Hashi et al. | 360/265.6 |
| 7,684,948 B2 | 3/2010 | Holwell et al. | |
| 7,889,459 B2 | 2/2011 | Lee et al. | |
| 7,911,740 B2 | 3/2011 | Warn | |
| 8,040,638 B2 | 10/2011 | Raymond | |
| 8,159,789 B2 * | 4/2012 | Fujimoto et al. | 360/265.9 |
| 8,233,243 B2 * | 7/2012 | Zhu et al. | 360/266.1 |
| 8,339,747 B1 * | 12/2012 | Hales et al. | 360/245.2 |
| 2003/0042895 A1 | 3/2003 | Mihara et al. | |
| 2005/0141140 A1 * | 6/2005 | Yazawa | 360/265.9 |
| 2006/0152856 A1 | 7/2006 | Zhao et al. | |
| 2006/0236527 A1 | 10/2006 | Davis et al. | |
| 2007/0046286 A1 | 3/2007 | Umezaki et al. | |
| 2007/0136022 A1 | 6/2007 | Anderson et al. | |
| 2007/0143053 A1 | 6/2007 | Holwell et al. | |
| 2007/0143054 A1 | 6/2007 | Anderson et al. | |
| 2007/0143055 A1 | 6/2007 | Anderson et al. | |
| 2007/0143056 A1 | 6/2007 | Anderson et al. | |
| 2007/0205763 A1 | 9/2007 | Yamasaki | |
| 2008/0060445 A1 | 3/2008 | Obergfell et al. | |
| 2008/0061776 A1 | 3/2008 | Collins et al. | |
| 2008/0062564 A1 | 3/2008 | Warn | |
| 2008/0247091 A1 | 10/2008 | Guzik et al. | |

OTHER PUBLICATIONS

Office Action dated Jun. 12, 2013 from U.S. Appl. No. 13/273,437, 12 pages.

Office Action dated Aug. 28, 2013 from U.S. Appl. No. 13/273,437, 8 pages.

Interview Summary dated Sep. 11, 2013 from U.S. Appl. No. 13/273,437, 2 pages.

Office Action dated Nov. 5, 2013 from U.S. Appl. No. 13/273,437, 9 pages.

Advisory Action dated Jan. 21, 2014 from U.S. Appl. No. 13/273,437, 7 pages.

Interview Summary dated Jan. 29, 2014 from U.S. Appl. No. 13/273,437, 3 pages.

Office Action dated Jan. 31, 2014 from U.S. Appl. No. 13/273,437, 6 pages.

* cited by examiner

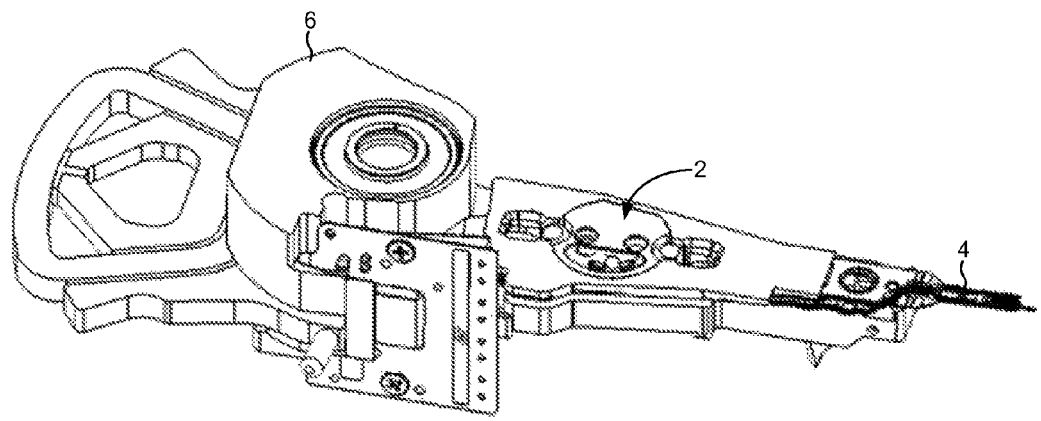
FIG. 1A
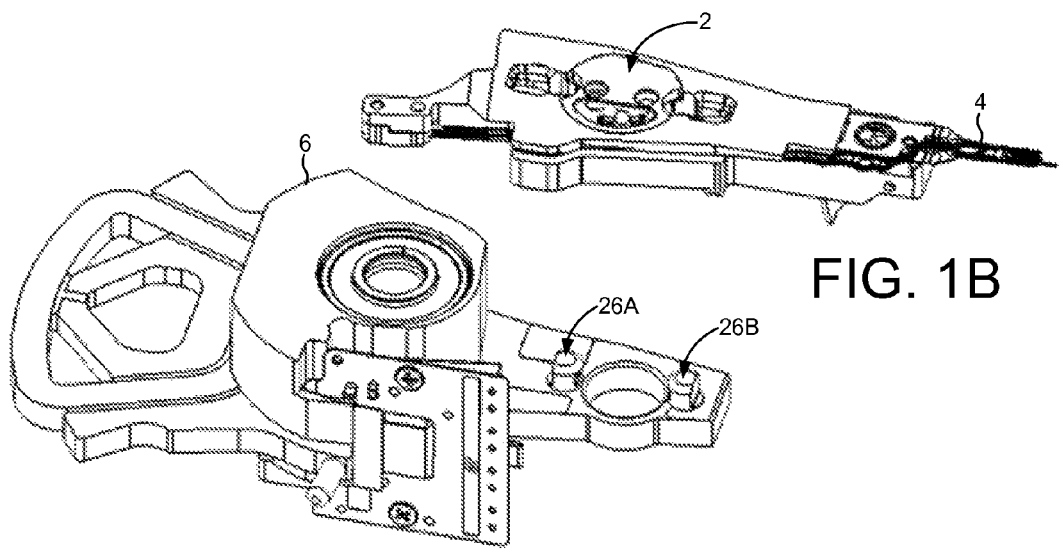
FIG. 1B
FIG. 1C

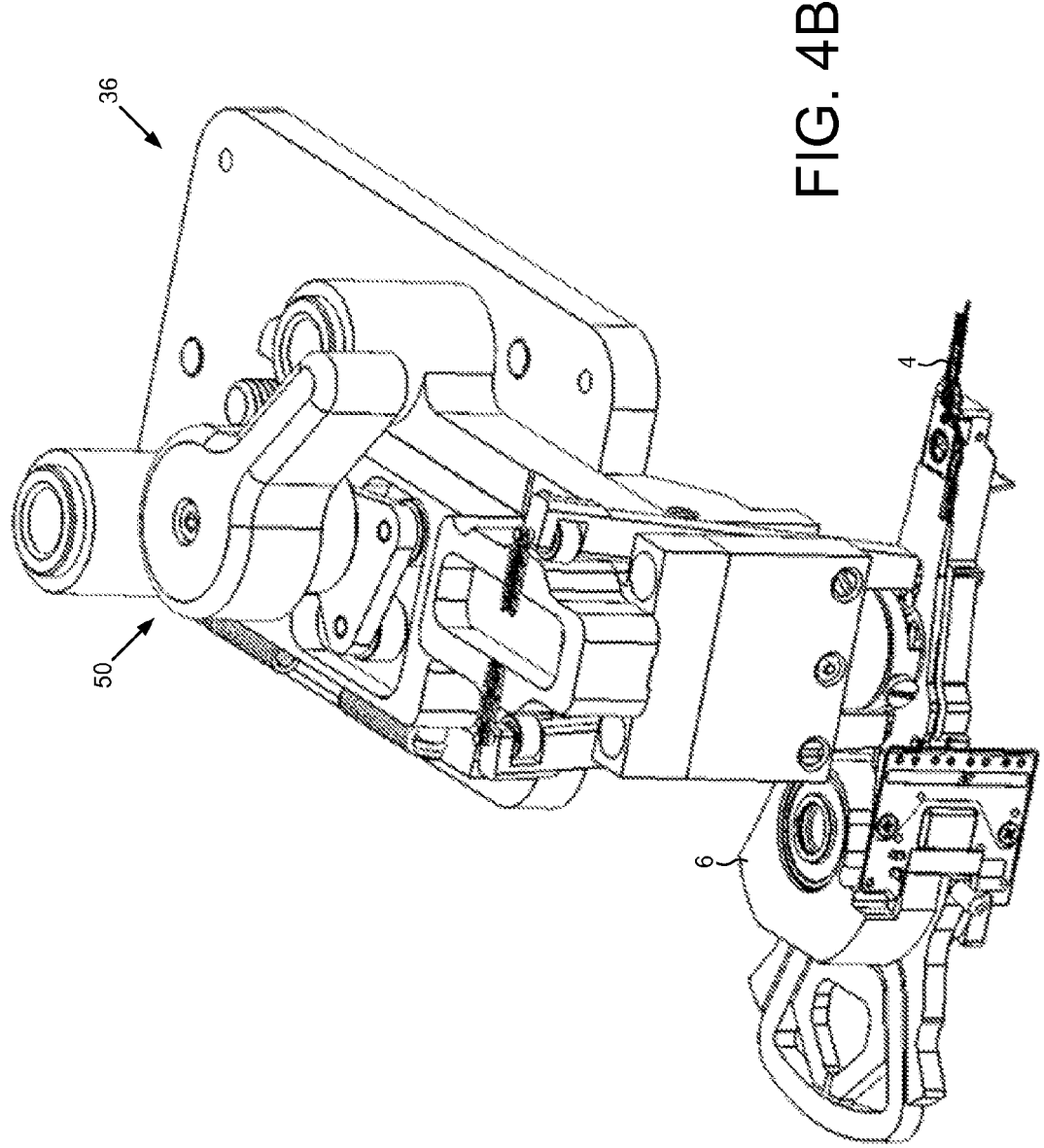

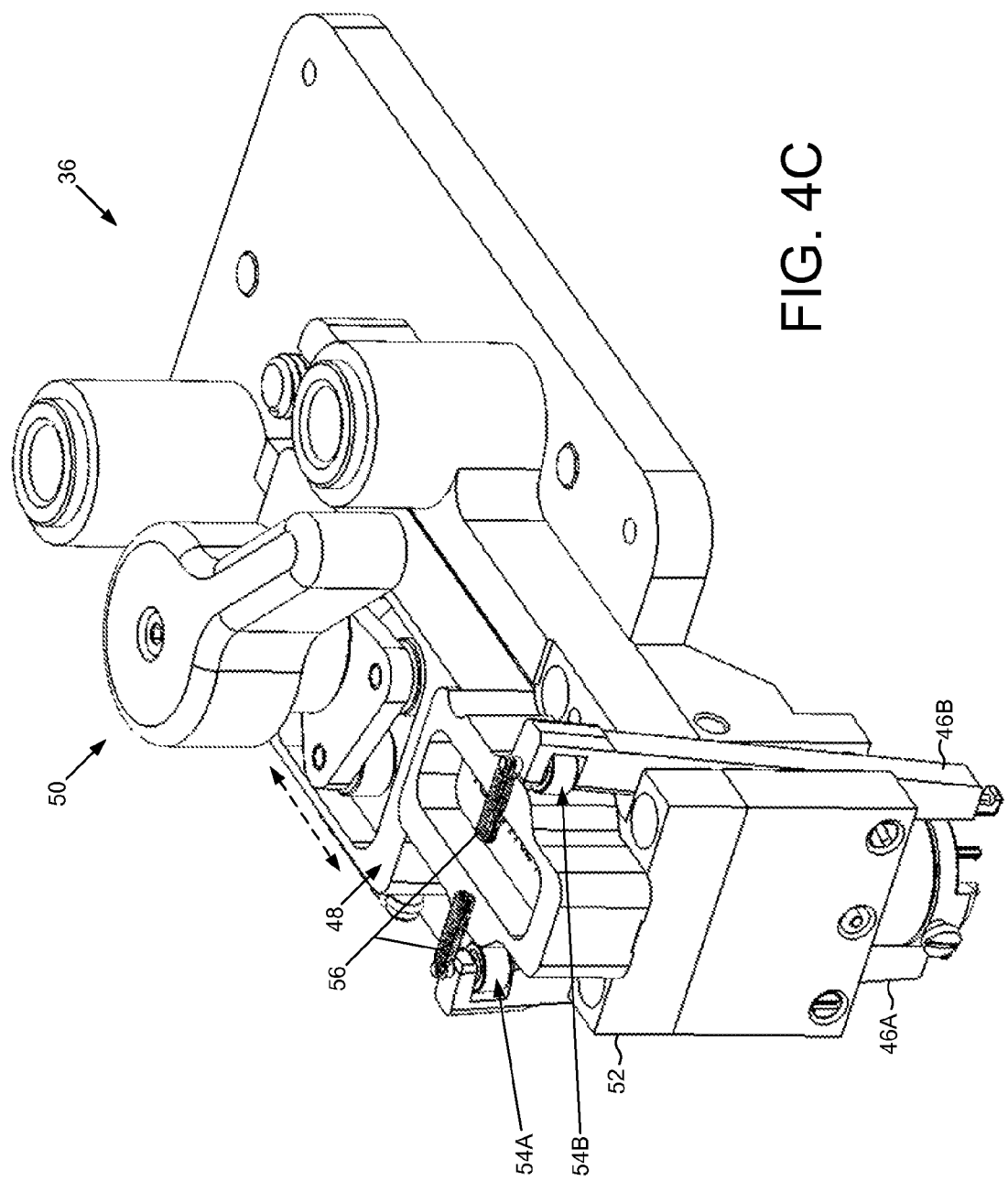

SUSPENSION CLAMP FOR CLAMPING A DISK DRIVE SUSPENSION TO AN ACTUATOR ARM

BACKGROUND

Disk drives comprise a head actuated over a disk by rotating an actuator arm about a pivot. The head is typically mounted on a slider that is coupled to a distal end of a suspension through a gimbal, wherein the suspension is coupled to a distal end of the actuator arm. It may be desirable to test a number of the suspensions, for example, as part of a quality control procedure to ensure that a sampled lot of the suspensions satisfy certain design specifications. If enough of the suspension fail the quality control procedure, the suspension manufacturing process may be modified so as to rectify the problem. When testing the suspensions, it is desirable to quickly clamp/unclamp the suspension to/from the actuator arm of a test station (e.g., a suitable spin stand or a disk drive based test station) so as to maximize the throughput of the testing procedure.

BRIEF DESCRIPTION OF THE DRAWINGS

FIG. 1A shows a disk drive suspension and actuator arm according to an embodiment of the present invention.

FIGS. 1B and 1C show an exploded view of the disk drive suspension and actuator arm according to an embodiment of the present invention.

FIG. 4B shows the transfer tool after clamping the disk drive suspension to the actuator arm according to an embodiment of the present invention.

FIG. 4C shows the transfer tool in an unlocked state after releasing the disk drive suspension according to an embodiment of the present invention.

DETAILED DESCRIPTION OF EMBODIMENTS OF THE INVENTION

Figure 2:
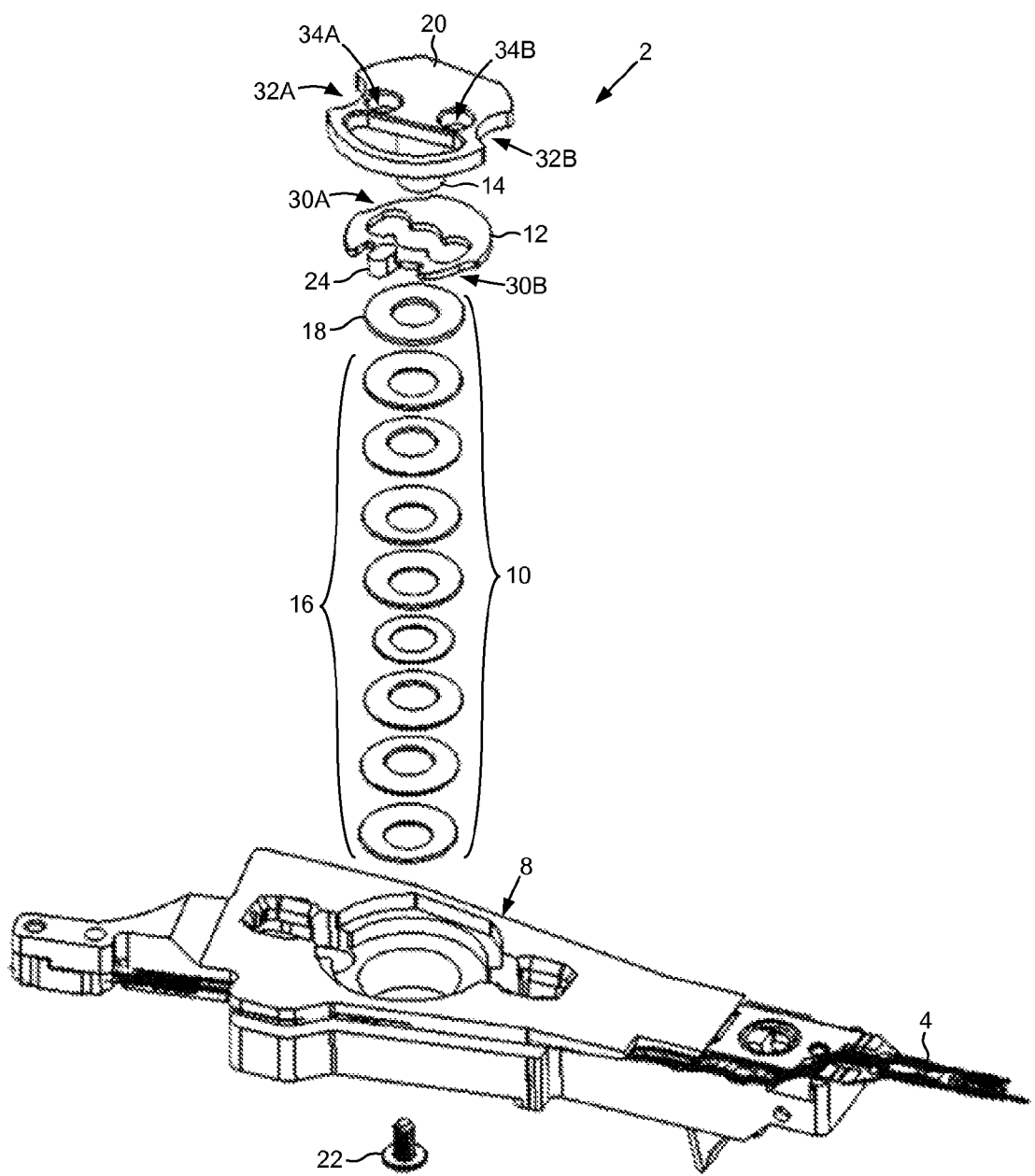
FIG. 2 shows an exploded view of a suspension clamp for clamping the disk drive suspension to the actuator arm according to an embodiment of the present invention.

FIGS. 1A-1C show a suspension clamp 2 for clamping a disk drive suspension 4 to an actuator arm 6. FIG. 2 shows an exploded view of a suspension clamp 2 according to an embodiment of the present invention comprising a housing 8 having a spring 10 operable to bias a latching member 12, wherein the latching member 12 is rotatable about a pivot 14. After compressing the spring 10 and rotating the latching member 12 in a first direction, the latching member 12 is operable to clamp the suspension 4 to the actuator arm 6 by decompressing the spring 10.

In the embodiment of FIG. 2, the spring 10 of the suspension clamp 2 comprises a plurality of Belleville washers forming a Belleville spring stack 16. A washer 18 applies a compression force to the Belleville spring stack 16 as described below. The suspension clamp 2 of FIG. 2 further comprises a cap 20 having a cylinder 14 inserted through an aperture of the latching member 12 and through the aperture of the washer 18 and Belleville spring stack 16. The inner chamber of the cylinder 14 is threaded for receiving a screw 22 that secures the cap 20 to the housing 8 as illustrated in the cross-sectional view of FIG. 3A. The latching member 12 shown in FIG. 2 comprises an actuating pin 24 inserted through an aperture of the cap 20 for rotating the latching member 12 about the cylinder 14 of the cap 20 as described below.

Figure 3A:
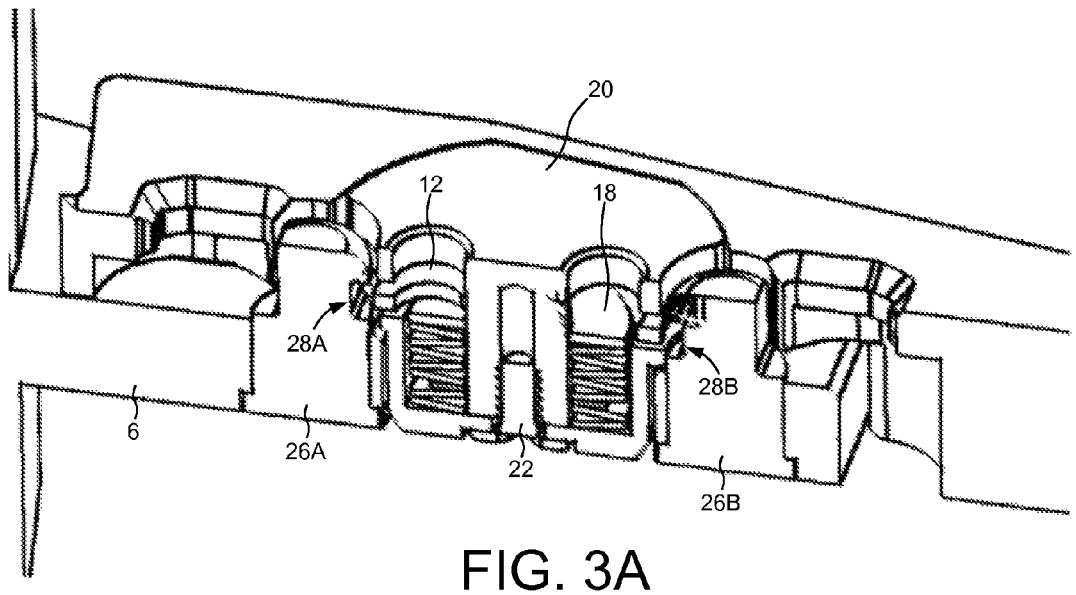
FIG. 3A shows a cross-sectional view of the suspension clamp in an unclamped state according to an embodiment of the present invention.

The suspension clamp 2 shown in FIGS. 1A-1C, FIG. 2, and FIG. 3A comprises apertures that slide over pins 26A and 26B of the actuator arm 6 when the suspension clamp 2 is placed onto the actuator arm 6. As shown in FIG. 3A, the pins 26A and 26B comprise a groove 28A and 28B that allow the latching member 12 to rotate within the grooves. Referring to FIG. 2, the latching member 12 comprises slots 30A and 30B and the cap 20 comprises slots 32A and 32B that allow the pins 26A and 26B of the actuator arm to slide through. The cap 20 comprises apertures 34A and 34B and the latching member 12 comprises corresponding apertures that allow push pins to pass through and apply a compression force to the washer 18, thereby compressing the Belleville spring stack 16 as illustrated in FIG. 3A (the push pins are not shown for clarity).

Figure 3B:
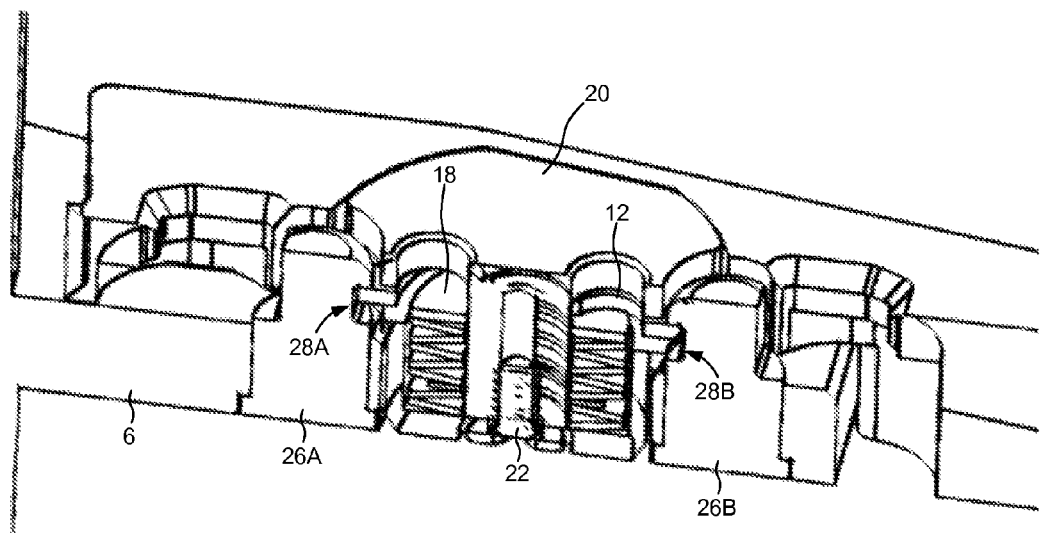
FIG. 3B shows a cross-sectional view of the suspension clamp in a clamped state according to an embodiment of the present invention.

After placing the suspension clamp 2 onto the actuator arm 6 and compressing the Belleville spring stack 16 as shown in FIG. 3A, the latching member 12 is rotated clockwise about the cylinder 14 of the cap 20. In one embodiment, a driving pin of a transfer tool actuates the pin 24 of the latching member 12 in order to rotate the latching member 12 about the cylinder 14. Referring to FIG. 3B, as the latching member 12 rotates, at least part of the latching member slides into the grooves 28A and 28B of the pins 26A and 26B. When the Belleville spring stack 16 is decompressed (by releasing the push pins), the latching member 12 engages the pins 26A and 26B within the grooves 28A and 28B, thereby clamping the suspension 4 to the actuator arm 6 as shown in FIG. 3B.

To unclamp the suspension 4 from the actuator arm 6, the compression force is applied to the washer 18 in order to compress the Belleville spring stack 16, and then the latching member 12 is rotated (in the opposite direction) about the cylinder 14 until the slots 30A and 30B of the latching member 12 align with the grooves 28A and 28B of the pins 26A and 26B. The suspension clamp 4 may then be lifted off of the actuator arm 6, and in an embodiment described below, using a transfer tool that performs the compression of the Belleville spring stack 16 and the rotation of the latching member 12.

In the embodiments described above, the suspension 4 is first clamped to a distal end of the suspension clamp housing 8, and then the suspension clamp housing 8 is clamped to the actuator arm 6 as shown in FIG. 1A. In another embodiment, the suspension clamp housing 8 may be integrated with the suspension 4, for example, using a suitable injection molding technique. In one embodiment, the suspension clamp 2 may be used to clamp the suspension 4 to the actuator arm 6 of a suitable test station, such as a spin stand or a disk drive based test station. When installed into a production line disk drive, the suspension 4 may be unclamped from the suspension clamp housing 8 and coupled to the actuator arm of a production line head stack assembly using a different clamping technique. In an alternative embodiment, the suspension clamp 2 for clamping the suspension to the actuator arm of the test station may also be used to clamp the suspension to the actuator arm of a production line disk drive.

Figure 4A:
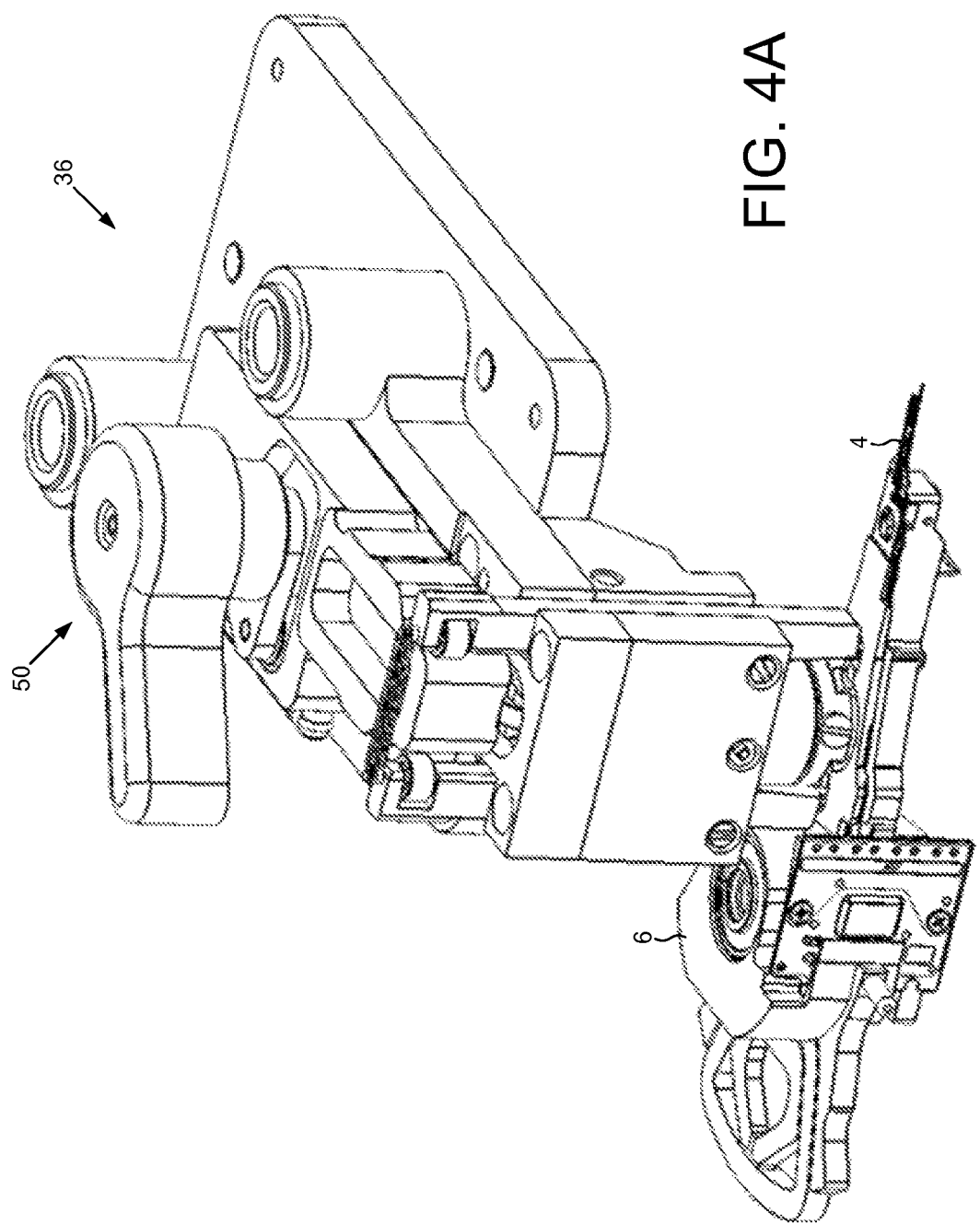
FIG. 4A shows a transfer tool according to an embodiment of the present invention for operating the suspension clamp in order to clamp the disk drive suspension to the actuator arm.

In one embodiment, a transfer tool is used to install the disk drive suspension 4 onto the actuator arm 6. FIG. 4A shows an example transfer tool 36 gripping the suspension 4 and placing the suspension 4 onto the actuator arm 6 prior to clamping the suspension 4 to the actuator arm 6. FIG. 4B shows the state of the transfer tool 36 after clamping the suspension 4 to the actuator arm 6, and FIG. 4C shows the transfer tool 36 after having been lifted away from the suspension 4.

In one embodiment, the transfer tool 36 comprises a first actuator 38 (FIG. 6) operable to actuate push pins 40A and 40B (FIG. 5A) to compress the spring 10 of the suspension clamp 2 and a second actuator 42 (FIG. 7A) operable to actuate a driving pin 44 (FIG. 5A), wherein the driving pin 44 for rotating the latching member 12 of the suspension clamp 2 about a pivot as described above with reference to FIGS. 2, 3A and 3B.

Figure 5A:
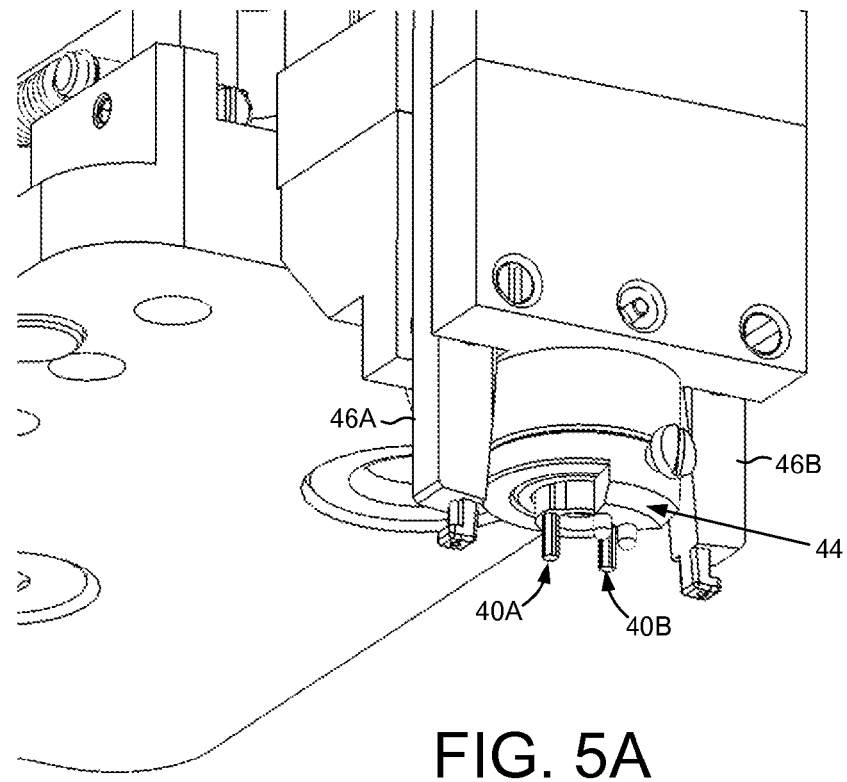
FIG. 5A shows push pins and a driving pin of the transfer tool in a locked state wherein the disk drive suspension is locked to the transfer tool according to an embodiment of the present invention.
Figure 6:
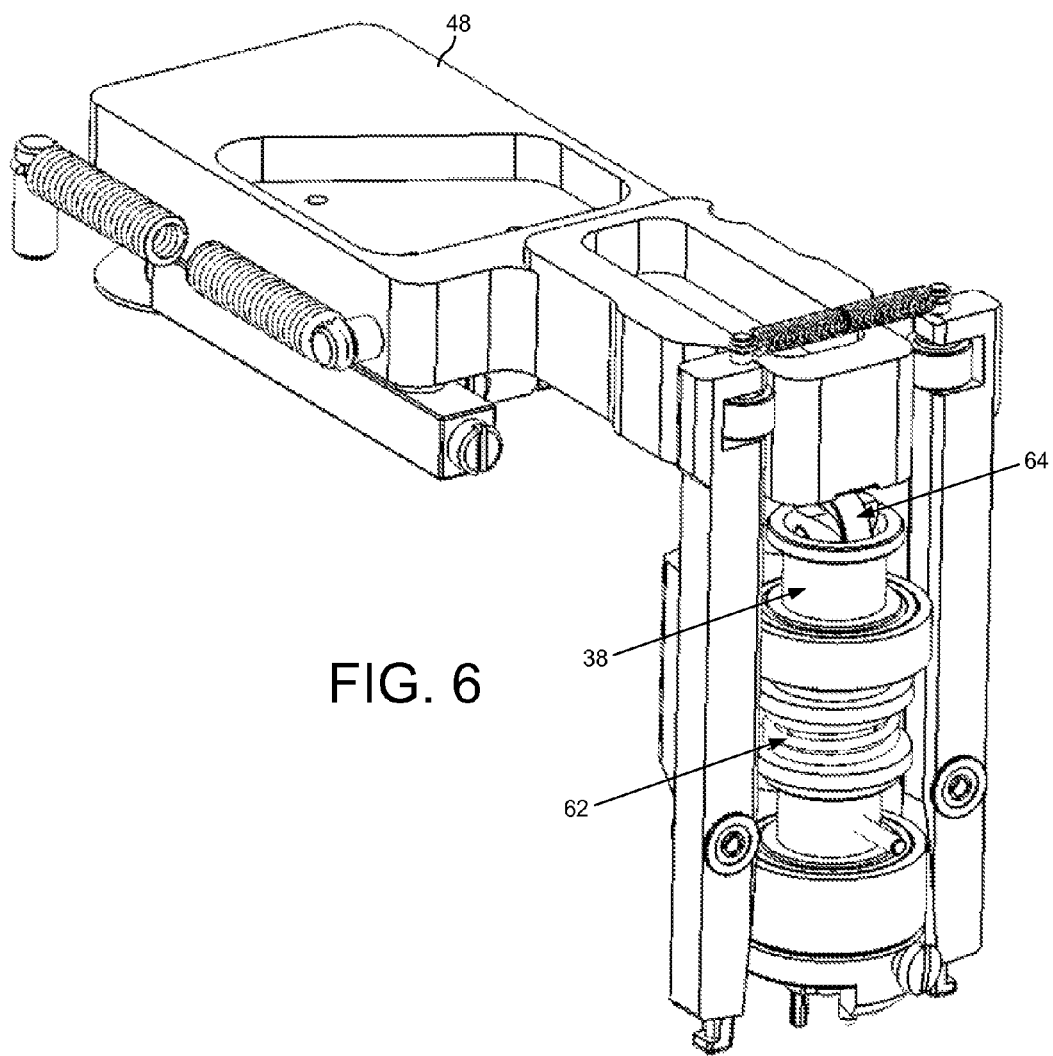
FIG. 6 shows a piston actuated by a sliding cam in order to actuate the push pins of the transfer tool according to an embodiment of the present invention.

FIG. 5A shows an embodiment of the transfer tool 36 comprising gripper arms 46A and 46B that are actuated by a sliding cam 48 (FIG. 4C) in order to grip the suspension 4. In the embodiment of FIG. 4C, the sliding cam 48 is actuated by a user operating a lever assembly 50 in order to slide the sliding cam 48 about a carriage 52 along the length of the transfer tool 36 as illustrated in FIG. 4C.

Figure 5B:
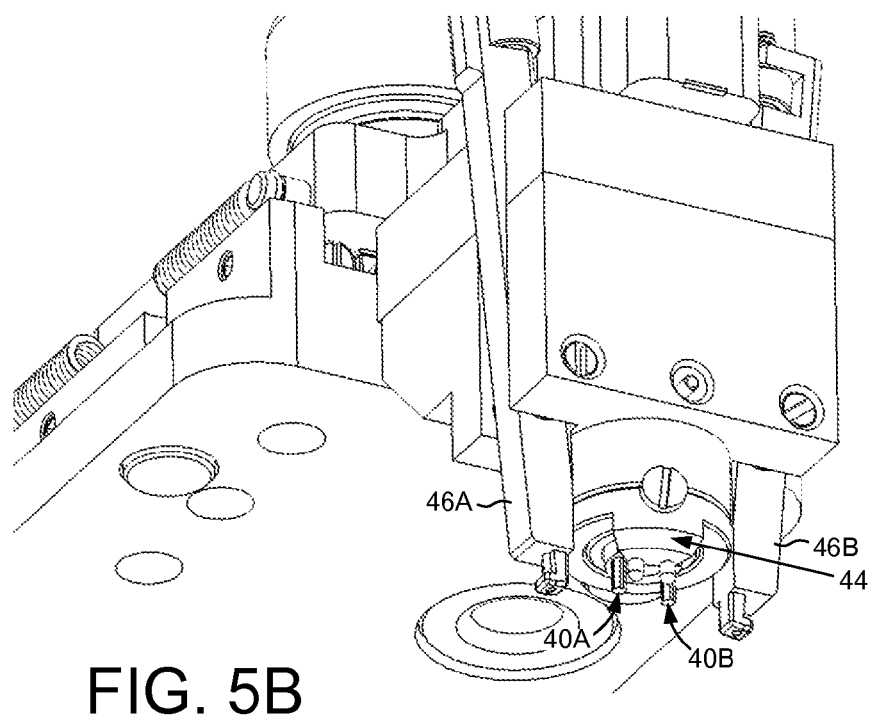
FIG. 5B shows the push pins and the driving pin of the transfer tool in the unlocked state after having clamped the disk drive suspension to the actuator arm according to an embodiment of the present invention.
Figure 8A:
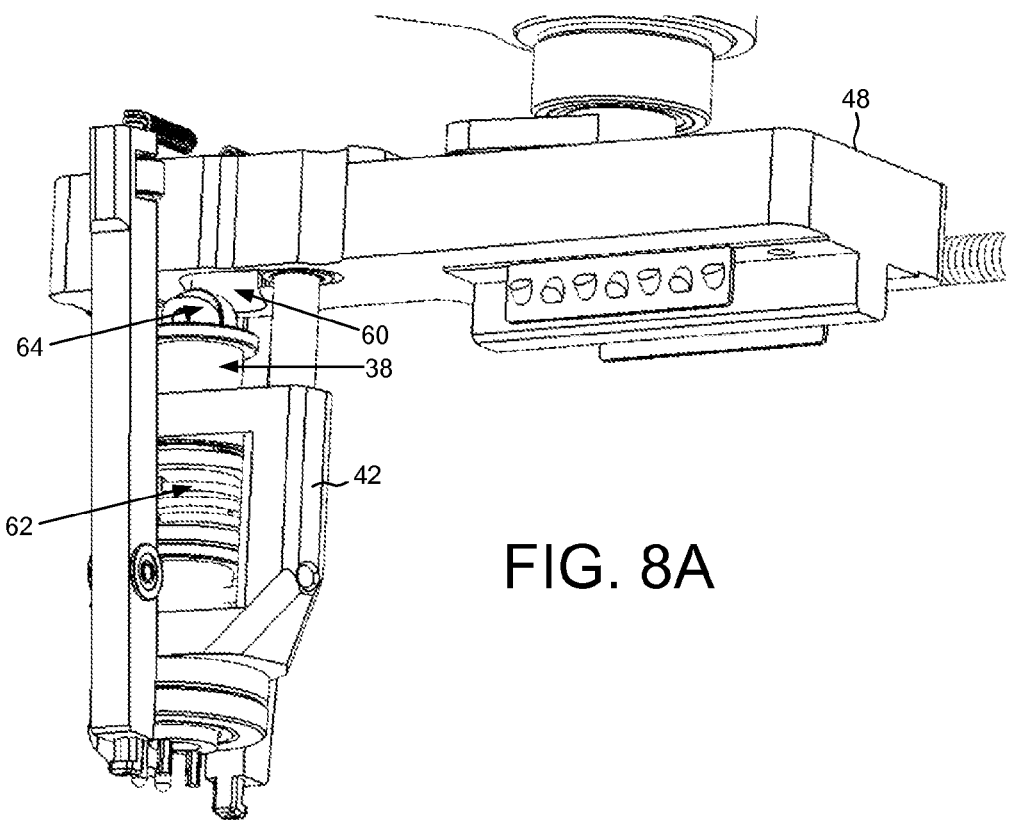
FIG. 8A shows the piston actuating the push pins to decompress the spring of the suspension clamp in order to latch the disk drive suspension to the actuator arm according to an embodiment of the present invention.

FIG. 4C shows the transfer tool in an unlocked state prior to gripping a suspension for installation onto an actuator arm. The sliding cam 48 comprises protrusions that spread apart and pivot the gripper arms 46A and 46B as the protrusions slide along bearings 54A and 54B of the gripper arms 46A and 46B. As the base ends of the of the gripper arms 46A and 46B spread apart, the distal ends contract toward one another as illustrated in FIG. 5B. In addition, the first actuator 38 (FIG. 8A) retracts the push pins 40A and 40B and the second actuator 42 (FIG. 8A) rotates the driving pin 44 to an unlocked position shown in FIG. 5B.

After the user rotates the lever assembly 50 to the unlocked position as shown in FIG. 4C, the user places the transfer tool over a suspension 4, for example, that may be stored in a tray. The distal ends of the gripper arms 46A and 46B slide through the apertures of the suspension 4 shown in FIG. 2. The user then rotates the lever assembly 50 to the locked position as illustrated in FIG. 4A. As the lever assembly 50 is rotated, the sliding cam 48 (FIG. 4C) slides from the front of the transfer tool 36 toward the back of the transfer tool 36. This causes the protrusions in the sliding cam 48 to slide along and away from the bearings 54A and 54B of the gripper arms 46A and 46B so that a spring 56 pulls the base ends of the gripper arms 46A and 46B toward one another thereby rotating the gripper arms 46A and 46B about the pivot so that the distal ends of the gripper arms 46A and 46B grip the suspension 4 as illustrated in FIG. 4A. As the sliding cam 48 slides further toward the back of the transfer tool 36, it actuates the first actuator 38 (FIG. 8A) in order to protrude the push pins 40A and 40B through the apertures 34A and 34B of the suspension clamp 2 (FIG. 2), thereby compressing the spring 10 of the suspension clamp 2. As the sliding cam 48 slides even further toward the back of the transfer tool 36, a bearing 58 of the second actuator 42 (FIG. 7A) follows a guide path 60 in the sliding cam 48, thereby rotating an arm of the second actuator 42 which rotates the driving pin 44 to the locked position shown in FIG. 5A. At this point, the suspension clamp 4 is locked to the transfer tool 36 allowing the user to place the suspension 4 onto the actuator arm 6 as illustrated in FIG. 4A.

Figure 7A:
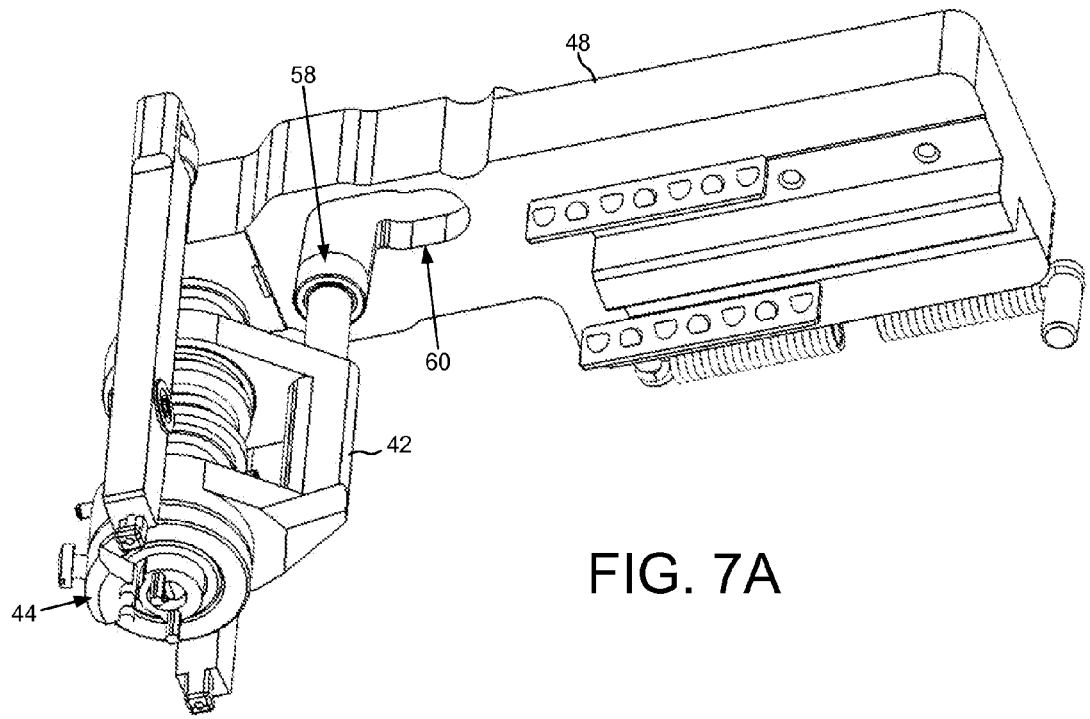
FIG. 7A shows a rotatable arm of the transfer tool actuated by the sliding cam in order to actuate the driving pin of the transfer tool according to an embodiment of the present invention.

In order to clamp the suspension 4 to the actuator arm 6, the user rotates the lever assembly 50 in the opposite direction to an unlocked position as shown in FIG. 4B. As the user begins rotating the lever assembly 50, the sliding cam 48 first rotates the arm of the second actuator 42 as the bearing 58 follows the guide path 60 (FIG. 7A). As the arm rotates, it rotates the driving pin 44 thereby rotating the latching member 12 of the suspension clamp into the clamping position as described above. As the sliding cam 48 slides further toward the front of the transfer tool 36, the first actuator 38 retracts the push pins 40A and 40B as illustrated in FIG. 5B, thereby releasing the compression force on the spring 10 of the suspension clamp 2 and clamping the suspension 4 to the actuator arm 6 as described above. In the embodiment shown in FIGS. 6 and 8A, the first actuator 38 comprises a piston biased by a spring 62 that is compressed as the sliding cam 48 slides over a bearing 64, thereby protruding the push pins 40A and 40B. When the bearing 64 slides into the guide path 60 of the sliding cam 48 (FIG. 8A), the compression force on the spring 62 is released thereby retracting the push pins 40A and 40B. As the sliding cam 48 slides further toward the front of the transfer tool 46, the protrusions in the sliding cam 48 contact the bearings 54A and 54B of the gripper arms 46A and 46B as illustrated in FIG. 4C, thereby releasing the distal ends of the gripper arms from the suspension 4. The transfer tool 36 may then be lifted away from the suspension 4 in the state shown in FIG. 4C.

Figure 7B:
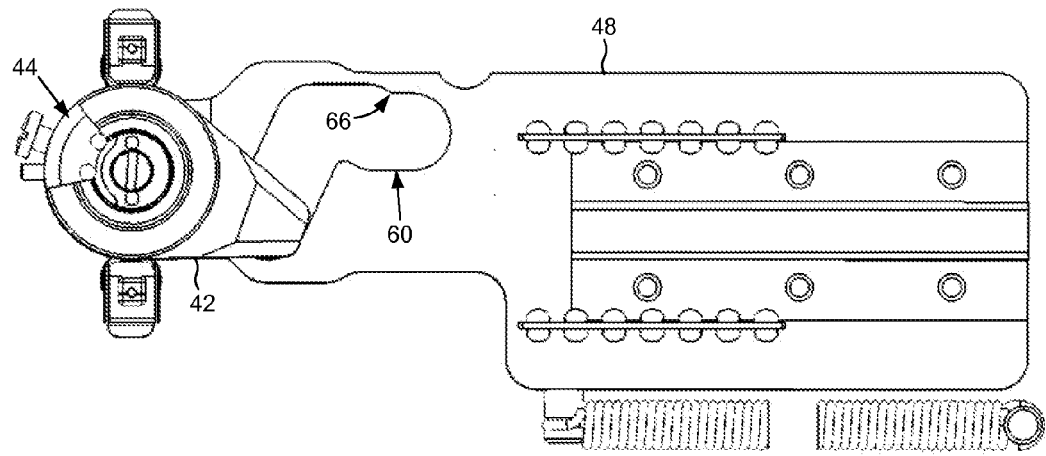
FIG. 7B shows a guide path in the sliding cam of the transfer tool including a recess for backing off the driving pin prior to releasing the disk drive suspension from the transfer tool according to an embodiment of the present invention.
Figure 8B:
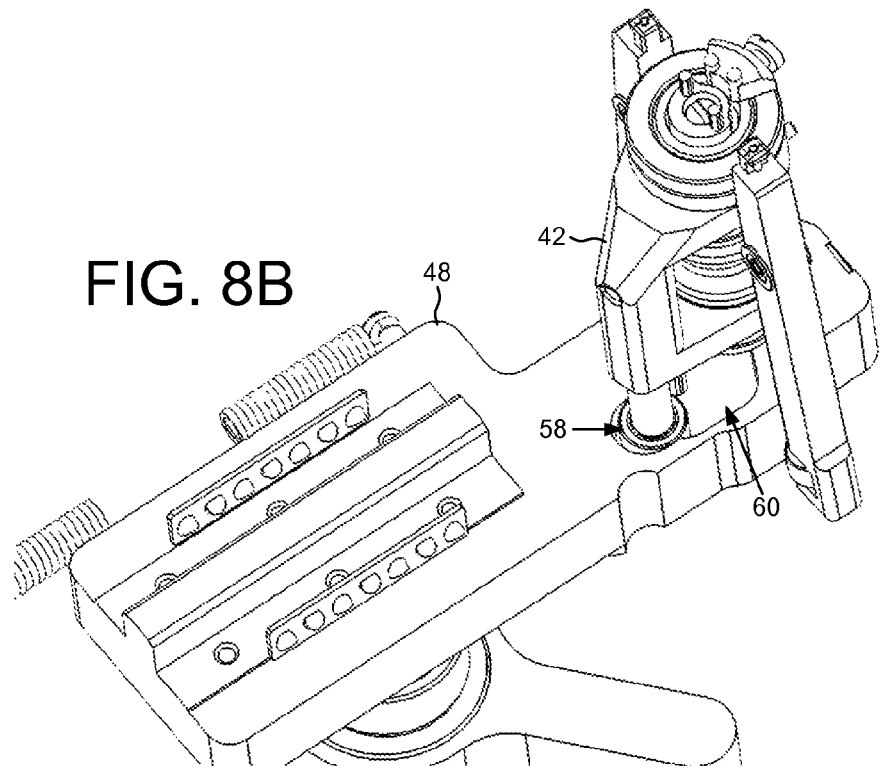
FIG. 8B illustrates the rotatable arm guided into the recess of the guide path in order to back off the driving pin prior to releasing the transfer tool from the disk drive suspension according to an embodiment of the present invention.

FIG. 7B shows the bottom of the sliding cam including a recess 66 in the guide path 60 that causes the arm 42 to rotate by a small amount at the end of the unlocking operation (end of the clamping operation) so as to back off the driving pin 44 from the pin 24 of the latching member 12 (FIG. 2) by a small amount. In this manner, when the transfer tool 36 is lifted away from the suspension 4 after the clamping operation, it helps reduce contamination that may other wise occur due to the driving pin 44 scraping along the pin 24 of the latching member 12. FIG. 8B illustrates the bearing 58 of the arm 42 within the recess 66 of the guide path 60 and how the recess 66 provides the back off feature.

Figure 9A:
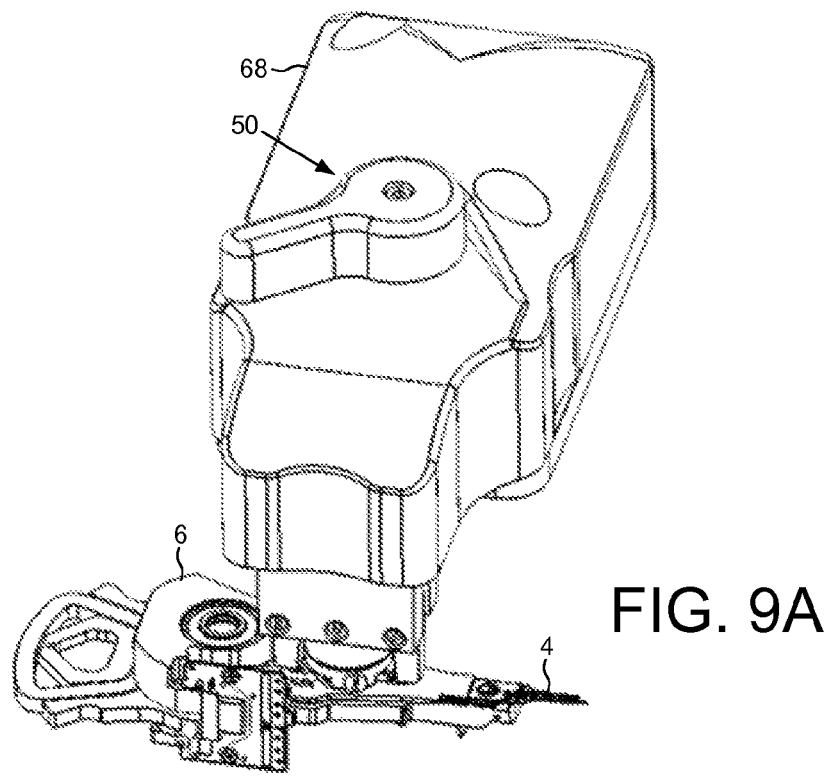
FIG. 9A shows the transfer tool including a cover, wherein the lever assembly is in the locked position (suspension being locked to the transfer tool) according to an embodiment of the present invention.
Figure 9B:
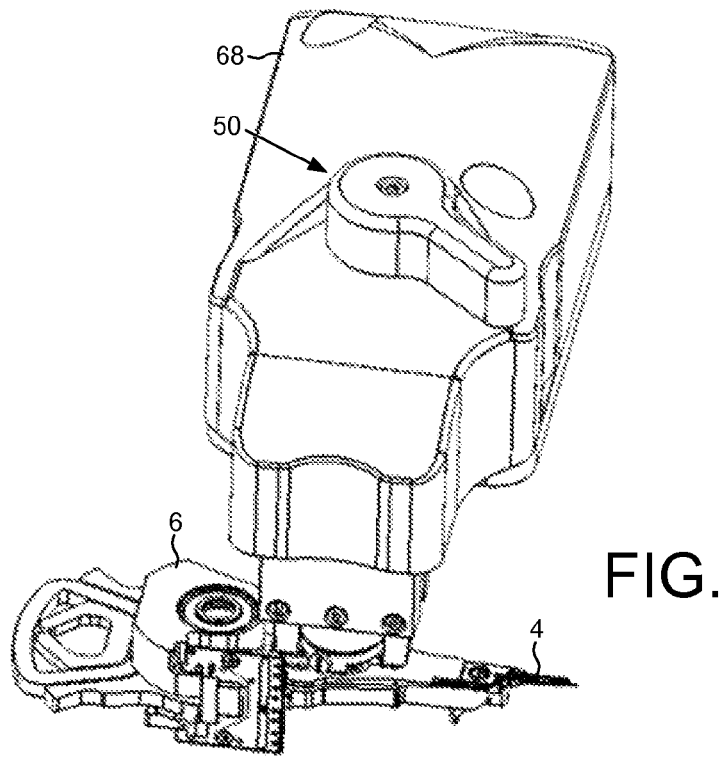
FIG. 9B shows the transfer tool including a cover, wherein the lever assembly is in the unlocked position (suspension clamped to the actuator arm and unlocked from the transfer tool) according to an embodiment of the present invention.

FIG. 9A shows an embodiment of the transfer tool 36 including a cover 68, wherein the lever assembly 50 is in the locked position (suspension 4 being locked to the transfer tool 36), and FIG. 9B shows the transfer tool 36 wherein the lever assembly 50 is in the unlocked position (suspension 4 clamped to the actuator arm 6 and unlocked from the transfer tool 36).

What is claimed is:

1. A method of operating a suspension clamp for clamping a disk drive suspension to an actuator arm, the method comprising:
    first compressing a spring within a housing of the suspension clamp;
    rotating a latching member within the housing about a pivot in a first direction; and
    after first compressing the spring and rotating the latching member in the first direction, clamping the suspension to the actuator arm by decompressing the spring so that the latching member engages the actuator arm.

2. The method as recited in claim 1, further comprising unclamping the suspension from the actuator arm by second compressing the spring and rotating the latching member in a second direction opposite the first direction.

3. The method as recited in claim 1, wherein the spring comprises a plurality of Belleville washers forming a Belleville spring stack.

4. The method as recited in claim 1, wherein the latching member comprises at least one slot, the method further comprises sliding a pin of the actuator through the slot.

5. The method as recited in claim 4, further comprising rotating the latching member within a groove of the pin.

6. The method as recited in claim 4, further comprising inserting a push pin through an aperture of the latching member to apply a compression force to the spring.

* * * * *